United States Patent
Van Duyn

(10) Patent No.: US 7,021,804 B2
(45) Date of Patent: *Apr. 4, 2006

(54) LAMP ASSEMBLY WITH MULTI-STAGE REFLECTOR

(75) Inventor: Paul D. Van Duyn, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/640,558

(22) Filed: Aug. 13, 2003

(65) Prior Publication Data

US 2005/0036326 A1    Feb. 17, 2005

(51) Int. Cl.
*F21V 7/00* (2006.01)

(52) U.S. Cl. .................. 362/516; 362/507; 362/514; 362/518; 362/522; 362/538; 362/539

(58) Field of Classification Search ................ 362/507, 362/514, 516, 517, 518, 521, 522, 538, 539
See application file for complete search history.

(56) References Cited

U.S. PATENT DOCUMENTS

| | | | |
|---|---|---|---|
| 3,751,659 A | | 8/1973 | Nordberg |
| 3,896,302 A | | 7/1975 | Whitney |
| 3,973,115 A | | 8/1976 | Jones et al. |
| 4,772,987 A | * | 9/1988 | Kretschmer et al. ........ 362/539 |
| 5,023,758 A | | 6/1991 | Allen et al. |
| 5,222,793 A | | 6/1993 | Davenport et al. |
| 5,718,505 A | * | 2/1998 | Daumueller et al. ........ 362/279 |
| 5,803,593 A | * | 9/1998 | Siminovitch et al. ....... 362/304 |
| 5,911,502 A | | 6/1999 | Zillgitt et al. |
| 6,059,435 A | * | 5/2000 | Hamm et al. ............... 362/514 |
| 6,179,455 B1 | * | 1/2001 | Taniuchi ..................... 362/507 |
| 6,190,029 B1 | * | 2/2001 | Taniuchi et al. ............ 362/512 |
| 6,234,655 B1 | | 5/2001 | Suehiro et al. |
| 6,286,985 B1 | | 9/2001 | Ohshio et al. |
| 6,425,683 B1 | | 7/2002 | Kusagaya et al. |
| 6,443,606 B1 | | 9/2002 | Mochizuki |
| 6,447,153 B1 | | 9/2002 | Kawamura |
| 6,454,448 B1 | * | 9/2002 | Taniuchi et al. ............ 362/517 |
| 6,457,849 B1 | | 10/2002 | Tsukamoto |
| 6,527,426 B1 | * | 3/2003 | Oyama et al. .............. 362/517 |
| 6,575,609 B1 | * | 6/2003 | Taniuchi et al. ............ 362/517 |
| 6,578,995 B1 | * | 6/2003 | Suzuki ........................ 362/514 |

(Continued)

FOREIGN PATENT DOCUMENTS

EP    0 661 495 A1    7/1995

(Continued)

*Primary Examiner*—John Anthony Ward
*Assistant Examiner*—Jacob Y. Choi
(74) *Attorney, Agent, or Firm*—Ice Miller LLP

(57) ABSTRACT

A lamp assembly with a multi-stage reflector is described for use with automobile lamps. A singular shield is positioned about a light source inside a housing. A first reflective surface and a second reflective surface are formed on the housing. The singular shield is moveable between a first position and a second position. In the first position, the moveable shield blocks light from striking the second reflective surface, and a main beam is projected from the lamp assembly. In the second position, the moveable shield allows light to strike both the first and second reflective surfaces, and a second beam is projected. Thus, the singular shield may be moved to switch between the main beam and the second beam, creating the ability to alter the functionality of the lamp assembly. More than two reflective surfaces and moveable positions may be used, to create a multitude of possible beam patterns.

22 Claims, 19 Drawing Sheets

U.S. PATENT DOCUMENTS

| | | |
|---|---|---|
| 6,578,997 B1 * | 6/2003 | Futami ................ 362/522 |
| 6,607,295 B1 * | 8/2003 | Hayakawa ............ 362/517 |
| 6,641,295 B1 * | 11/2003 | Hu ...................... 362/545 |
| 6,837,601 B1 * | 1/2005 | Tatsukawa ............ 362/512 |
| 2001/0010634 A1 | 8/2001 | Yokoi |
| 2001/0015896 A1 | 8/2001 | Tsukamoto |
| 2001/0033495 A1 | 10/2001 | Hashiyama et al. |
| 2002/0044451 A1 | 4/2002 | Leleve |
| 2002/0051364 A1 | 5/2002 | Ishikawa |
| 2002/0051365 A1 | 5/2002 | Yokoi |
| 2002/0067619 A1 | 6/2002 | Ikeda et al. |
| 2002/0145883 A1 | 10/2002 | Akizuki et al. |
| 2003/0174509 A1 * | 9/2003 | Futami ................ 362/517 |

FOREIGN PATENT DOCUMENTS

| | | |
|---|---|---|
| EP | 0 976 974 A2 | 2/2000 |
| EP | 1 079 173 A2 | 2/2001 |
| EP | 1 248 034 A2 | 10/2002 |
| JP | P2001-118407 A | 4/2001 |
| JP | P2002-56707 A | 2/2002 |

* cited by examiner

LAMP ASSEMBLY WITH MULTI-STAGE REFLECTOR

BACKGROUND

Various signaling and roadway illumination functions are required to be installed on modern automobiles. For example, automobiles are required to have left and right turn signals, brake lighting, and headlamps. Additionally, automobile manufacturers include alternate illumination functions as may be desired by the consumer group. As an example, daytime running lights, forward headlamps illuminated during the daytime, are sought as a desirable feature of an automobile to provide an extra level of protection for the consumer. As such, automobile manufacturers find it advantageous to provide alternate illumination on their automobiles, to help sway the consumer's buying decision.

Unfortunately, each of the required and alternate illumination functions usually require a separate bulb and reflector, or a completely different lamp assembly. The use of these illumination functions, and multiple bulbs, is a drain on the automobile's electrical system, and automobile performance and efficiency suffers as a result of the increased electrical demand. The cost of manufacturing an automobile with the illumination functions is increased, raising the price of the automobile. The chances of failure of any one of the bulbs, or of damage to the expensive bulbs or reflectors of each of the lamp assemblies, is also a consideration. Further, since the lamp assemblies must be fixed to the front or the rear of the automobile, an increase in the size or number of headlamps or tail lamps requires that more space be used for these purposes on the front and rear of the automobile. Of course, the more space consumed by the headlamps and tail lamps leaves less room in the automobile for other desired features. Modern automobile engine compartments are very crowded, and space is often at a premium.

A substantial improvement for a lamp assembly would include the ability to project two or more illumination functions using one lamp assembly. Such an improvement would allow for additional space in the automobile and reduce complexity by replacing a plurality of bulbs and reflectors with one bulb and one reflector. The reduction in complexity would reduce the cost associated with providing the illumination functions, and would also reduce the operating cost by reducing the number of potential bulbs that require replacement or repair. The improvement would also reduce the electrical demands of the totality of the illumination functions, by reducing the total number of bulbs that require electricity at one time.

SUMMARY

A lamp assembly with a multi-stage reflector comprises a reflector and a light source positioned to emit light toward the reflector. The reflector comprises a first reflective surface, a second reflective surface, and a non-reflective surface located between the first reflective surface and the second reflective surface. A singular shield, which may be substantially cylindrical, curves partially around the light source. A driver is attached to the singular shield, such that the driver is operable to move the singular shield between a first position and a second position.

Located in the first position, the singular shield blocks light emitted from the light source from striking the second reflective surface, and allows light to strike the first reflective surface, creating a first beam pattern. Located in the second position, the singular shield allows light to strike both the first reflective surface and the second reflective surface, creating a second beam pattern, comprising the first beam pattern and a separate peripheral beam created by reflected light from the second reflective surface.

In an alternate embodiment, a third reflective surface may be present on the reflector, the third reflective surface and the second reflective surface separated by a second non-reflective surface. In this embodiment, the driver is operable to move the singular shield between a first position, a second position, and a third position. Operation of this alternate embodiment is similar to the operation of the above mentioned embodiment, with the exception that a third beam pattern may be formed by moving the singular shield into the third position. This third beam pattern comprises the second beam pattern and a separate peripheral beam created by reflected light from the third reflective surface.

In another alternate embodiment, a peripheral lens may be included to receive light reflected from the second or third reflective surface. The peripheral lens may comprise a single ring-shaped reflective lens that forms a halo or ring-shaped beam pattern that surrounds the other beam patterns. The peripheral lens may also comprise a plurality of peripheral lenses that provide a beam pattern having several points of light positioned about the optical axis of the lamp assembly.

These and other advantages and features shall hereinafter appear, and for the purposes of illustration, but not limitation, exemplary embodiments shall hereinafter be described.

DETAILED DESCRIPTION

Figure 1:
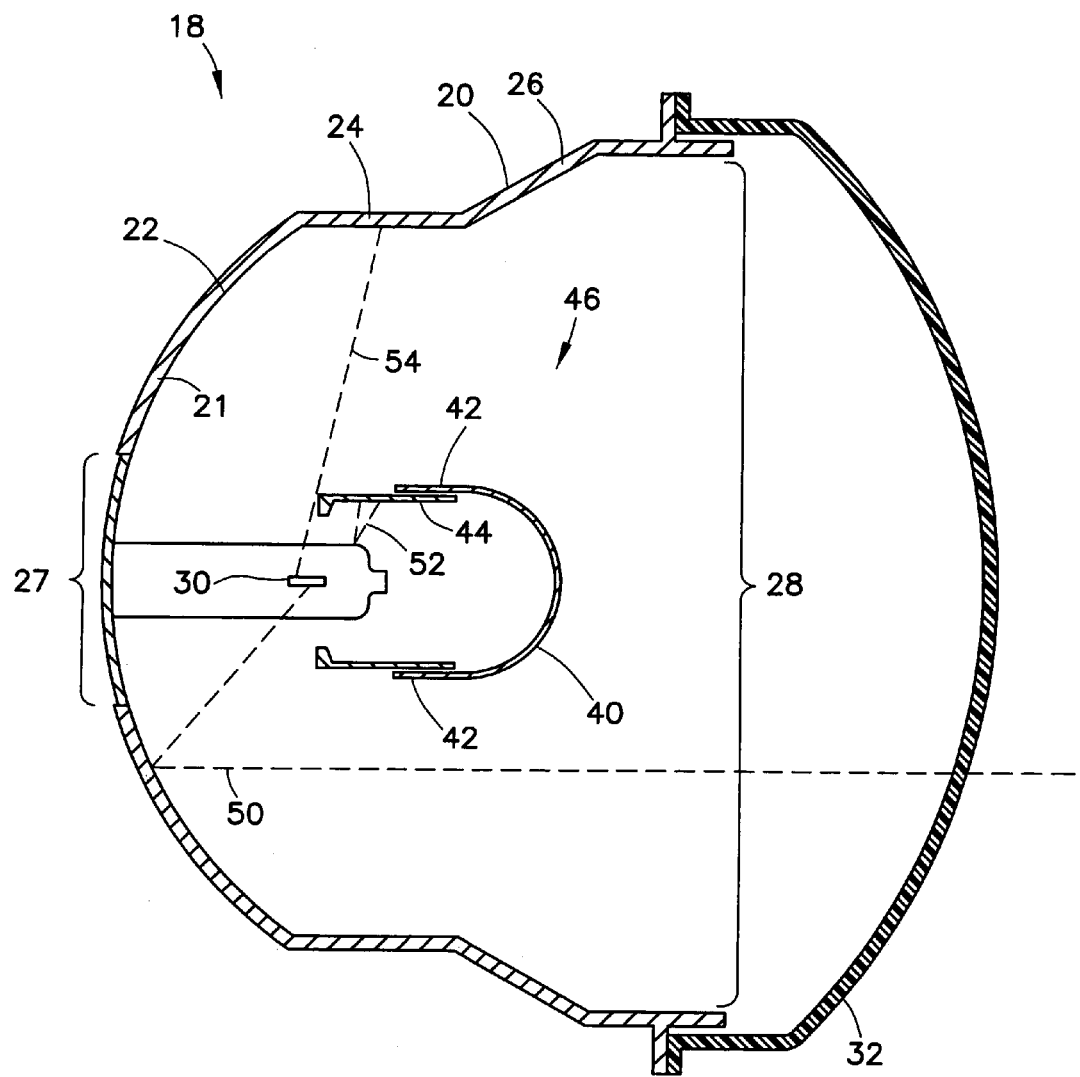
FIG. 1 is side cross sectional view of an embodiment of a lamp assembly with a peripheral auxiliary function.
Figure 3:
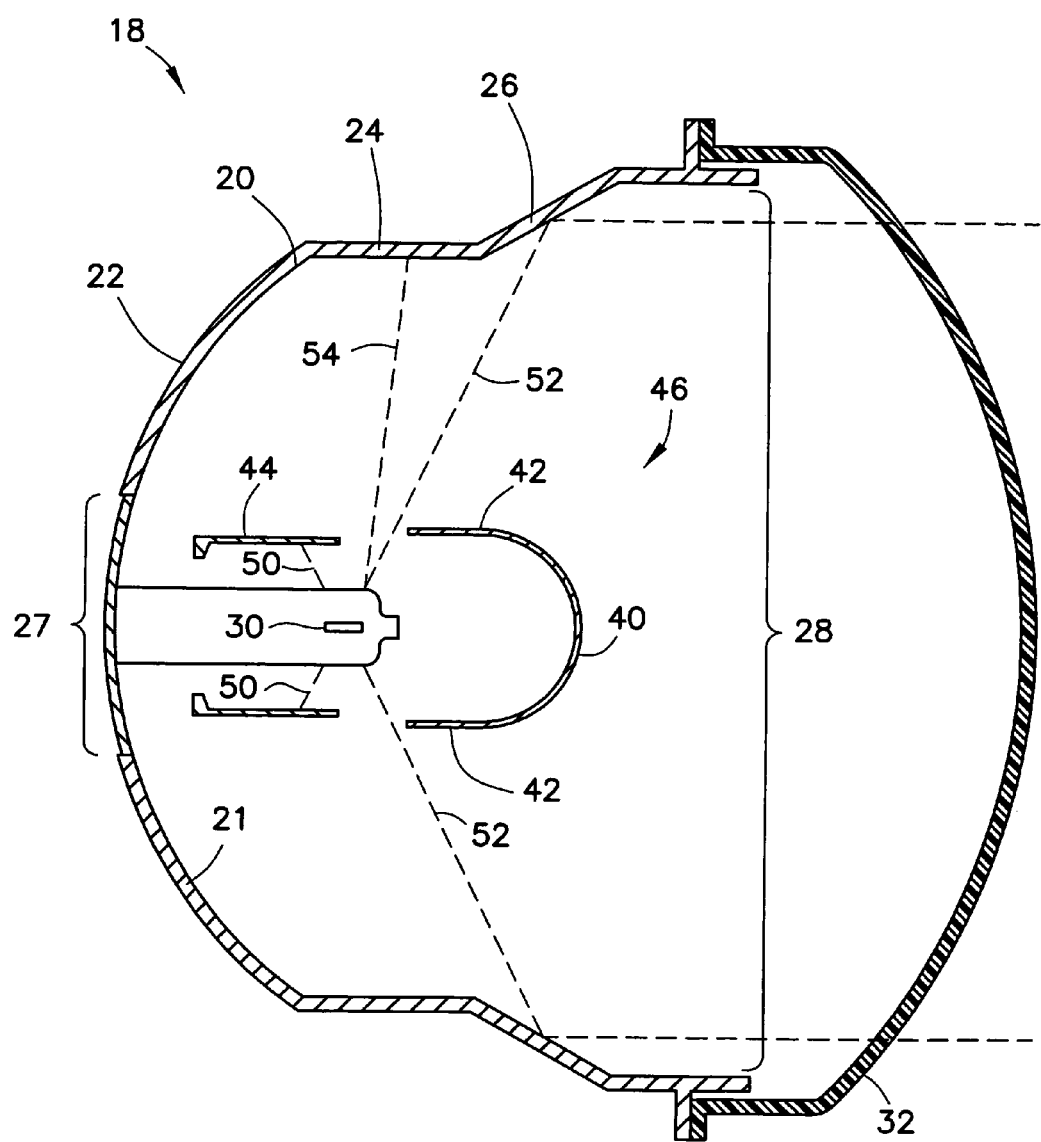
FIG. 3 is a side cross sectional view of the lamp assembly, as in FIG. 1, where the moveable shield is moved toward the rear portion of the lamp assembly.

A lamp assembly with peripheral auxiliary function is provided as shown in FIGS. 1 and 3, and is generally indicated as numeral 18. With reference to FIGS. 1 and 3, the lamp assembly with peripheral auxiliary function 18 comprises a housing 20 and a lens 32. The inside of the housing 20 forms a reflector 21. The reflector 21 has a first reflective surface 22 and a second reflective surface 26, interrupted by a non-reflective surface 24 positioned between the first reflective surface 22 and the second reflective surface 26. A light source 30 is positioned within the housing 20. A fixed shield 42 and a moveable shield 44 both partially surround the bulb. The moveable shield 44 is attached to a driver/actuator (not shown), such as a solenoid, or other means capable of providing linear movement to the shield 44. The driver moves the shield 44 in a linear fashion such that the moveable shield 44 may be moved between a first position, overlapping the fixed shield 42, and a second position, disjoined from the fixed shield 42. Located in the first position, the moveable shield 44 operates with the fixed shield 42 to allow light from the light source 30 to only strike the first reflective surface 22. Located in the second position, the moveable shield 44 operates with the fixed shield 42 to allow light from the light source 30 to only strike the second reflective surface 26. The positioning and properties of the first reflective surface 22 and the second reflective surface 26 allows the beam projected from each surface to have distinct properties. This and alternate embodiments are discussed in more detail below.

The exterior of the lamp assembly 18 is formed by the housing 20 and the lens 32. The housing 20 contains a first housing opening 27 and a second housing opening 28. The first housing opening 27 is dimensioned to receive an electrical connector/socket (not shown) and light source 30, such as a standard bulb assembly for headlamps. The second housing opening 28 is a comparable diameter to the lens 32. The walls of the housing 20 at the second housing opening 28 and the lens 32 abut one another, and are sealed together. The seal may be accomplished in one of a number of ways known in the art. The union of the housing 20 and the lens 32 defines a cavity 46. The lens 32 is manufactured from a transparent material, and may optionally have optics integrated therein, which serve to focus or angle emitted light rays.

Two reflective surfaces are formed on the inside surface of the housing 20. The first reflective surface 22 is formed on the inside surface of the housing 20 directly behind the light source 30. The first reflective surface 22 has a cup-like shape and is formed from a section of a hyperbola of revolution or other similar surface, as is common in the art for preparing reflectors. The non-reflective surface 24 is formed on the reflector 21 adjacent to the first reflective surface 22. The non-reflective surface 24 is generally cylindrical in shape with a slight cone-like taper. The second reflective surface 26 is formed on the reflector 21, adjacent to the non-reflective surface 24, such that the non-reflective surface 24 is between the first reflective surface 22 and the second reflective surface 26. The second reflective surface 26 is also formed as a section of hyperbola of revolution or other similar surface as is common the art for preparing reflectors. However, the second reflective surface 26 appears more like a section of a cone than the first reflective surface 22 as it is generally formed from the portion of the hyperbola of revolution that is further removed from the axis of revolution than the first reflective surface 22. The first reflective surface 22 and the second reflective surface 26 are both formed from material which substantially reflects light rays. Each of the two reflective surfaces has a focal point at or near the light source 30. Techniques for coating the inside surface of the housing 20 with a reflective material, or optionally for forming the housing 20 out of a reflective material, are well known in the art. Of course, the first and second reflectors need not be formed as part of the housing 20, and may be provided as separate from the housing 20 and positioned within the housing 20. For example, the first and second reflective surfaces could be provided on an internal aimable type reflector positioned within the lamp cavity formed by the outer housing and lens.

The non-reflective surface 24 is, in one embodiment, a matte surface formed from any material which substantially absorbs light rays. Optionally, the non-reflective surface 24 may comprise a reflective surface that is substantially parallel to the optical axis of the light source 30, such that the surface 24 reflects light emitted from the light source 30 back in the general direction of the light source, instead of out of the housing 20. The reflector 21 may be coated with the non-reflective material, or the housing 20 may be formed, in whole or in part, from the non-reflective material. Of course, the non-reflective matte section may need not be formed as part of the housing 20, and may be provided as separate from the housing 20 and positioned within the housing 20. Furthermore, as mentioned previously, in an alternate embodiment, the non-reflective surface 24 could be a reflective or partially reflective surface that does not substantially contribute to the light beam formed by the first or second reflective surfaces 22 or 26.

The light source 30 and electrical socket/connector (e.g., a standard bulb assembly) is attached to the housing 20 at the first housing opening 27. When the electrical socket is attached to the housing 20, the light source 30 enters the cavity 46 through the first housing opening 27. The electrical socket provides an electrical attachment point to the automobile's electrical system. The concept of an electrical socket and light source 30 is well understood and practiced in the art. Of course, the light source 30 may be any of the headlamp bulbs or other light sources known in the art, for example, incandescent, halogen, high-intensity gas discharge, or one or more light-emitting diodes.

The fixed shield 42 is positioned within the housing 20 between the light source 30 and the lens 32. The fixed shield 42 is substantially cylindrical, with an open end and a closed end. The exterior closed end 40 of the fixed shield 42 may have an amount of stylization, to function as a decorative cap for the light source 30, as is well known in the art, such as a chrome finish. The interior surface of the fixed shield is coated with a non-reflective finish or is made of some other light absorbing material to prevent much of the light entering the interior of the fixed shield from escaping the fixed shield. A frame/strut (not shown) for supporting the fixed shield 42 is attached to the housing. The support strut extends into the cavity 46 from the housing to attach to the fixed shield. The strut (not shown) is formed from a rigid material, and provides support for the fixed shield 42. The strut establishes the position of the fixed shield 42 in the lamp cavity relative to the reflector 21.

The moveable shield 44 is positioned behind the fixed shield and at least partially encompasses the light source. The moveable shield 44 is substantially cylindrical, with two open ends. The outer diameter of the moveable shield 44 is less than the inner diameter of the fixed shield 42, so that the moveable shield 44 may be positioned within the fixed shield 42. The interior cylindrical portion of the moveable shield 44 is coated with a non-reflective surface or is made of some other substantially light absorbing material. The moveable shield 44 is positioned within the housing 20, and is adapted to move between a first position and a second position. In the first position, the moveable shield 44 is partially inside of the fixed shield 42, and also partially surrounds the light source 30, as shown in FIG. 1. As shown in FIG. 3, the moveable shield 44 may be moved away from the lens 32 and out from within the fixed shield 42, into the second position. Even in the second position the moveable shield 44 still partially surrounds the light source 30. In the second position, an opening is formed between the fixed shield 42 and the moveable shield 44. The opening that is present when the moveable shield 44 is located in the second position is closed when the moveable shield 44 is returned to the first position, as the moveable shield 44 and the fixed shield 42 overlap.

The driver/actuator (not shown) is attached to the housing 20. The actuator comprises a moveable shaft and/or support strut that is attached to the moveable shield 44. Movement of the actuator shaft and/or support strut between a first position and a second position results in movement of the moveable shield 44 between a first position and a second position. The actuator may further comprise a spring used to bias the actuator shaft into either the first position or the second position. The actuator may comprise a solenoid or other mechanical or electro-mechanical devices capable of producing movement as are well known in the art.

A headlamp control system (not shown) is in electrical communication with the driver. The headlamp control system (not shown) may be a microprocessor or another controller, which receives input from various sensors or switches, such as dashboard switches under human operation. The headlamp control system (not shown) controls the driver by selectively applying an electric current movement means.

Figure 2:
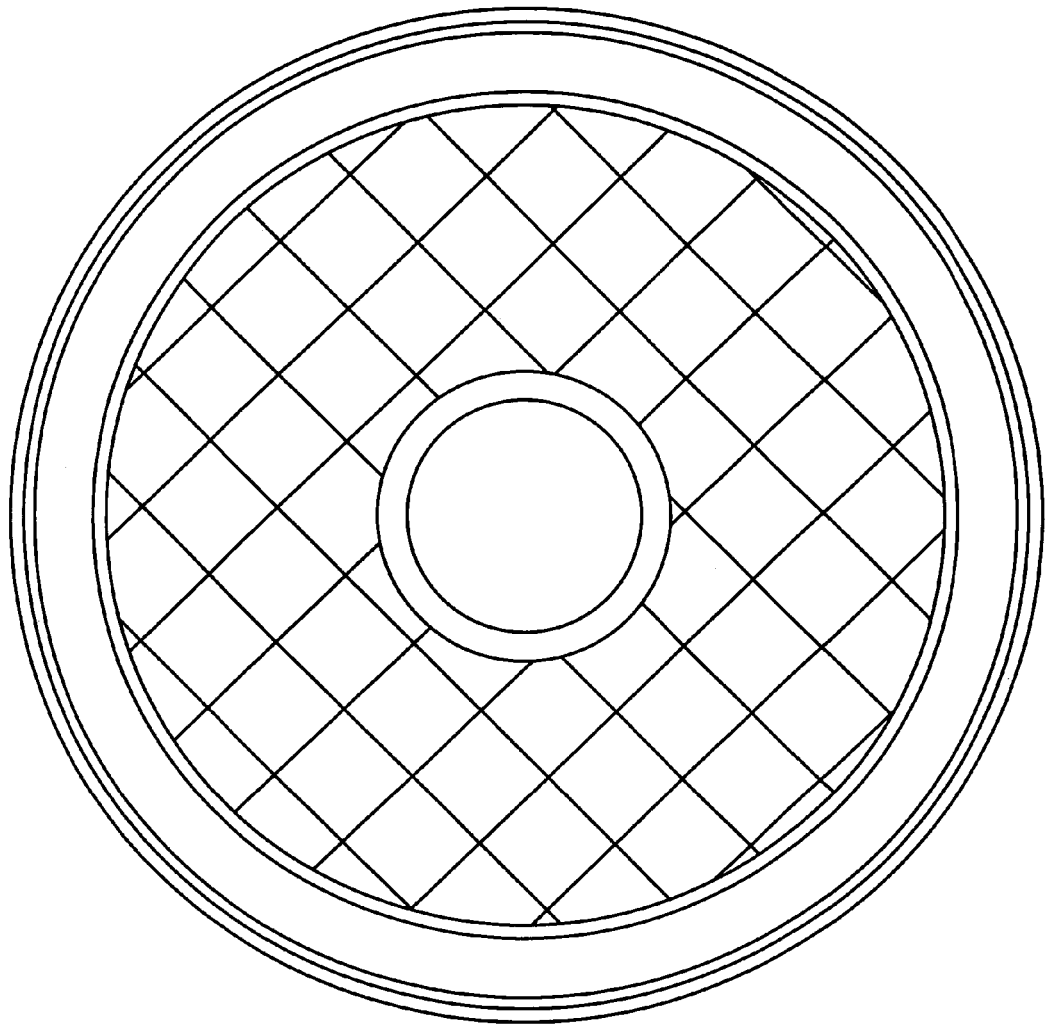
FIG. 2 is an exemplary front view of the lighted pattern of the lamp assembly of FIG. 1.

Operation of the disclosed embodiment of a lamp assembly with peripheral auxiliary function is now described with reference to FIGS. 1-4. As explained in greater detail above, the moveable shield 44 is moveable between a first position and a second position. In the first position, the moveable shield 44 and the fixed shield 42 overlap. The moveable shield 44 is shown in the first position in FIG. 1. Light rays 50 emitted from the light source 30 toward the first reflective surface 22 are allowed to strike the first reflective surface 22 and are reflected outside of the lamp assembly. Other light rays 52 emitted from the light source 30 toward the second reflective surface 26 strike the moveable shield 44 instead of the second reflective surface 26 and are absorbed, so the light rays are substantially blocked from striking the second reflective surface 26. Yet other light rays 54 emitted from the light source 30 toward the non-reflective surface 24 either strike the non-reflective surface 24 of the housing 20 and are absorbed (or do not contribute to the resulting light beam), or strike the moveable shield 44 and are absorbed. Light is therefore substantially reflected by only the first reflective surface 22 of the lamp assembly when the moveable shield 44 is in the first position. As shown in FIG. 2, the light pattern (i.e., beam pattern) produced by the lamp assembly with the moveable shield 44 in the first position is denoted by a cross-hatch pattern, and comprises a lighted circular area immediately surrounding the fixed shield 42. As will be noticed with respect to FIG. 2, and other figures herein, the shape of the beam pattern is described with respect to a front view of the lamp assembly. Light reflected from the second reflective surface 26 is used to provide a auxiliary lamp function, such as daytime running lamps (DRL) or a fog lamp. When this is the case, light reflected from the first reflective surface is typically used for something exclusive of DRL or fog lamps, such as a high beam lamp.

Figure 4:
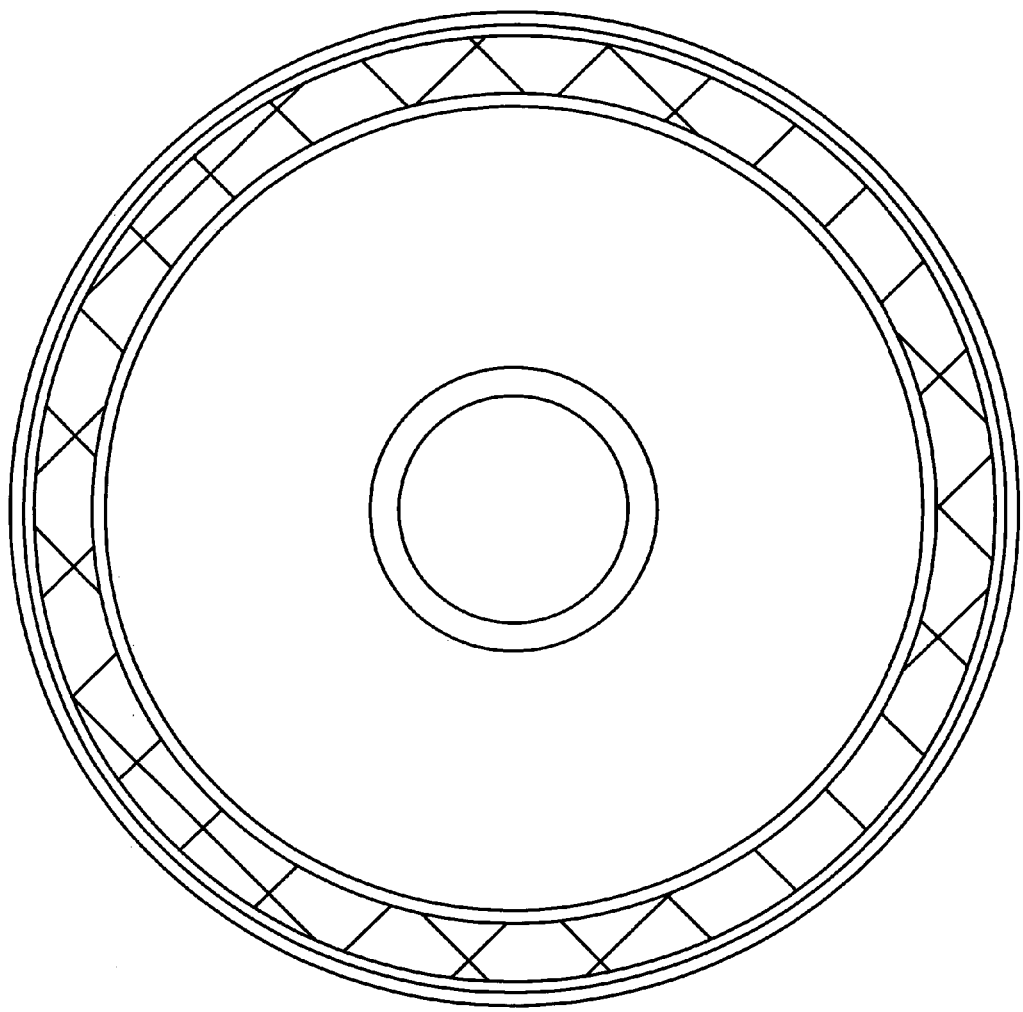
FIG. 4 is an exemplary front view of the lighted pattern of the lamp assembly of FIG. 3.

When the operator of the automobile having the lamp assembly wishes to utilize the auxiliary headlamp function, the operator toggles a switch or other control device, instructing the driver to move the moveable shield to the second position. The second position of the moveable shield 44 is shown in FIG. 3. In the second position, the moveable shield 44 and the fixed shield 42 do not overlap, leaving an opening between the two shields. In this instance, light rays 50 emitted from the light source 30 toward the first reflective surface 22 are absorbed by the moveable shield 44, so the light rays are substantially blocked from striking the first reflective surface 22. Light rays 54 emitted from the light source 30 toward the non-reflective surface 24 are either absorbed by the non-reflective surface 24 or by the moveable shield 44. Light rays 52 emitted from the light source 30 to the second reflective surface 26 pass through the opening created between the moveable shield 44 and the fixed shield 42, strike the second reflective surface 26, and are reflected outside of the lamp assembly. As shown in FIG. 4, the light pattern produced by the lamp assembly with the moveable shield 44 in the second position is denoted by a cross-hatch pattern, and comprises a lighted ring (or "halo") surrounding the fixed shield 42 and further away from the center than the light pattern of the moveable shield 44 in the first position (shown in FIG. 2). Light reflected from the second reflective surface 26 is used to provide a auxiliary lamp function, such as high-beam lights or daytime running lamps.

It should be noted that the above-described lamp assembly is designed to optimize filament exposure and also prevent beam flutter. In particular, in many prior art lamp assemblies, the light shield blocks a portion of the light source from certain peripheral portions of the reflector, but does not completely block the light source from these portions. The light in these peripheral portions of the reflector gradually diminishes between a point where the reflector is fully exposed to the filament and a point where the reflector is completely blocked from the filament. This portion of the reflector is often referred to as the "diminishing portion," because the light reflected from this portion of the reflector gradually dims as the reflector is positioned from full filament exposure to no filament exposure. As seen in the embodiment shown in FIG. 1, the diminishing portion of the reflector is found on the non-reflective surface 24. Thus, the first reflective surface 22 is completely exposed to the filament, optimizing the reflective surface area required to create the beam. Furthermore, because the diminishing portion of the beam is directed to the non-reflective surface 24, which is substantially horizontal, the vertical height of the lamp is reduced over typical prior art reflectors including a first reflective portion and integral second reflective portion with a diminishing portion included therebetween (as the diminishing portion of the reflector typically includes some vertical component).

In addition to the foregoing, it should also be noted that the lamp assembly includes certain tolerances to prevent beam flutter. Referring again to FIG. 1, only a portion of the non-reflective surface 24 receives light from the filament of the light source. The remaining portion of the non-reflective surface does not receive light from the light source. This leaves a significant portion of the non-reflective surface to absorb any variations in the light from the light source before the light accidentally strikes the second reflective surface 26, resulting in unwanted reflection and glare from the second reflective surface. Thus, automobile vibration (that results in vibration of the reflector and lamp assembly during operation of the automobile) will not result in beam flutter, as variations in the amount of light that is blocked by the light shield in the first position will be seen only on the non-reflective surface of the reflector. Other factors can also contribute to variations in the amount of light that is blocked by the light shield, including imperfections in the dimensions of the lamp assembly and variations in the degree of movement of the shield. However, in all cases, the variations in the amount of light blocked by the light shield will only be seen on the non-reflective surface of the reflector and will not contribute to beam flutter or other unwanted glare conditions.

Alternate embodiments shall herein be described. It should be understood that any of the functionality inherent in the appended alternate embodiments may be combined with the embodiment described above.

Figure 5:
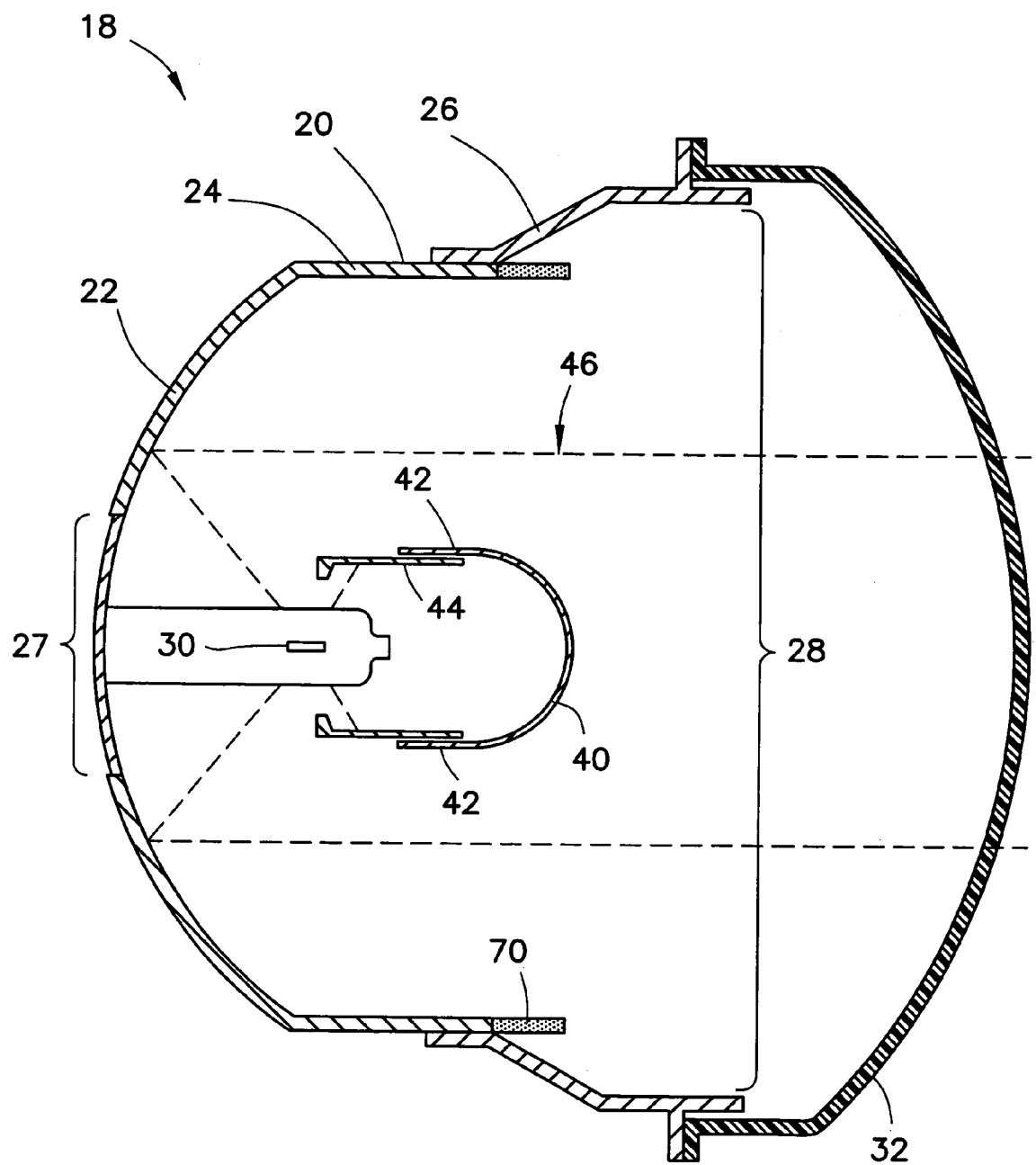
FIG. 5 is a side cross sectional view of a first alternate embodiment of a lamp assembly with a peripheral auxiliary function.

In a first alternate embodiment, as shown in FIG. 5, all of the elements of the embodiment disclosed above are present. In addition to the above defined elements, a transparent color film 70 is positioned within the housing 20, extending from the non-reflective surface 24, and over the second reflective surface 26. The transparent color film 70 is formed from any of a number of transparent or translucent materials, such as glass or plastic materials. The material is colored to selectively pass light of a specific wavelength or wavelengths, and absorb light outside of the specific wavelengths. Thus, the transparent color film 70 imparts a color to light which is transmitted through it, depending on the color of the transparent color film 70. In the first alternate embodiment, any color of transparent color film 70 is contemplated for use. The position of the transparent color film 70 in the housing 20 is such that light emitted from the light source 30 must travel through the transparent color film 70 in order to strike the second reflective surface 26. The transparent color film 70 thus imparts a specific color to light reflected out of the lamp housing 20, shown as numeral 72 in FIGS. 6 and 7, by the second reflective surface 26, which may be a different color than the light reflected out of the housing 20 by the first reflective surface 22. Therefore, the color of the light emitted from the lamp assembly when the moveable shield 44 is in the first position, as shown in FIG. 2, is different than the color of the light emitted from the lamp assembly with the moveable shield 44 is in the second position, as shown in FIG. 4, because the transparent color film 70 changes the color of the light reflected from the second reflective surface 26.

In a second alternate embodiment, as shown in FIGS. 8–11, all of the elements of the embodiment disclosed in FIGS. 1 and 3 above are present. In addition to the above defined elements, a ring-shaped retainer 80 is positioned between the second reflective surface 26 and the lens 32. The ring shaped retainer includes an exterior support portion 82, a central ring portion 83, and an interior support portion 86. The exterior support portion 82 is attached to the inner surface of the housing 20, near the second housing opening 28, and extends into the lamp cavity where it is integral with the central ring portion 83. The interior support portion 86 is also integral with and extends from the central ring portion 83 further into the lamp cavity. A plurality of peripheral lenses 84 are sequentially positioned on the central ring portion between the exterior support portion 82 and the interior support portion 86. The peripheral lenses may be circular or any other desired shape. Each peripheral lens 84 is manufactured from a transparent material, and may optionally have optics integrated therein, which serve to focus or angle emitted light rays. Each peripheral lens 84 may optionally be made from a material which allows light of a certain wavelength or range of wavelengths to pass, therefore imparting a distinct color to light radiated outside of the lamp assembly. Both the exterior support portion 82 and the interior support portion 86 are formed from a substantially non-reflective material, or are coated on the reflector side with a substantially non-reflective material. The lens side of the ring shaped retainer 80 may be coated with a reflective and/or decorative material, such as chrome.

Figure 8:
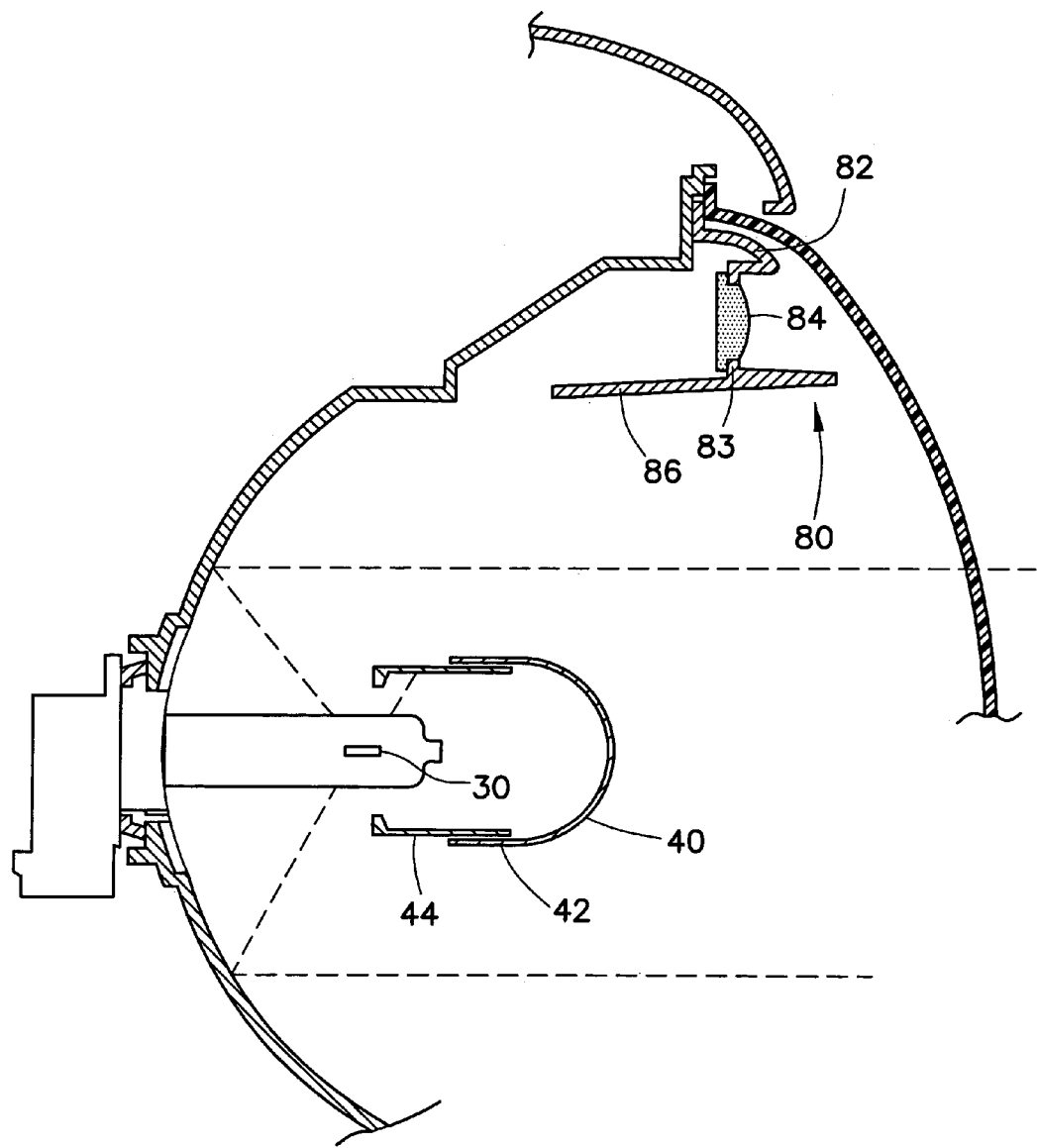
FIG. 8 is a side cross sectional view of a second alternate embodiment of a lamp assembly with a peripheral auxiliary function.
Figure 9:
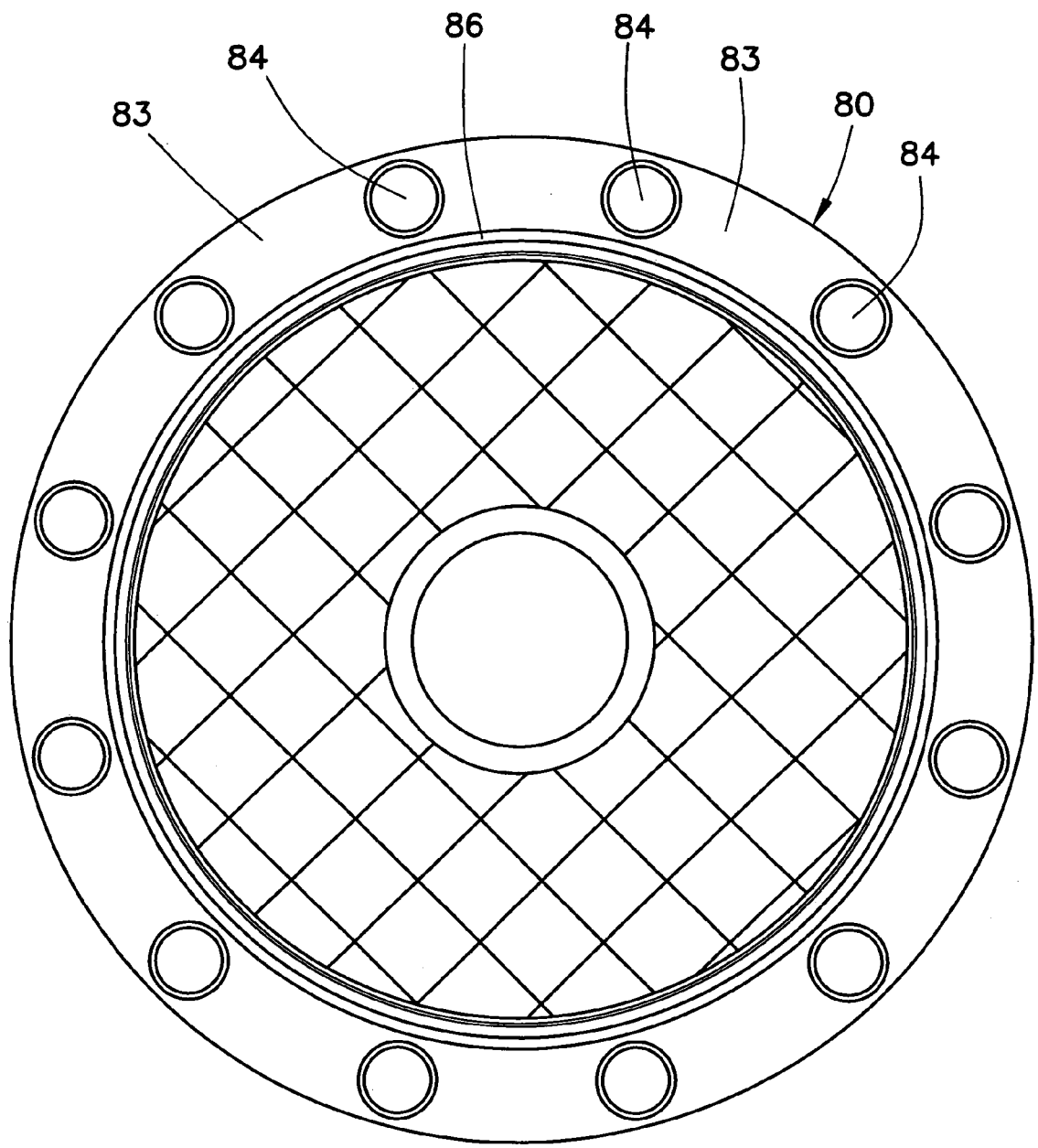
FIG. 9 is an exemplary front view of the lighted pattern of the lamp assembly of FIG. 8.
Figure 10:
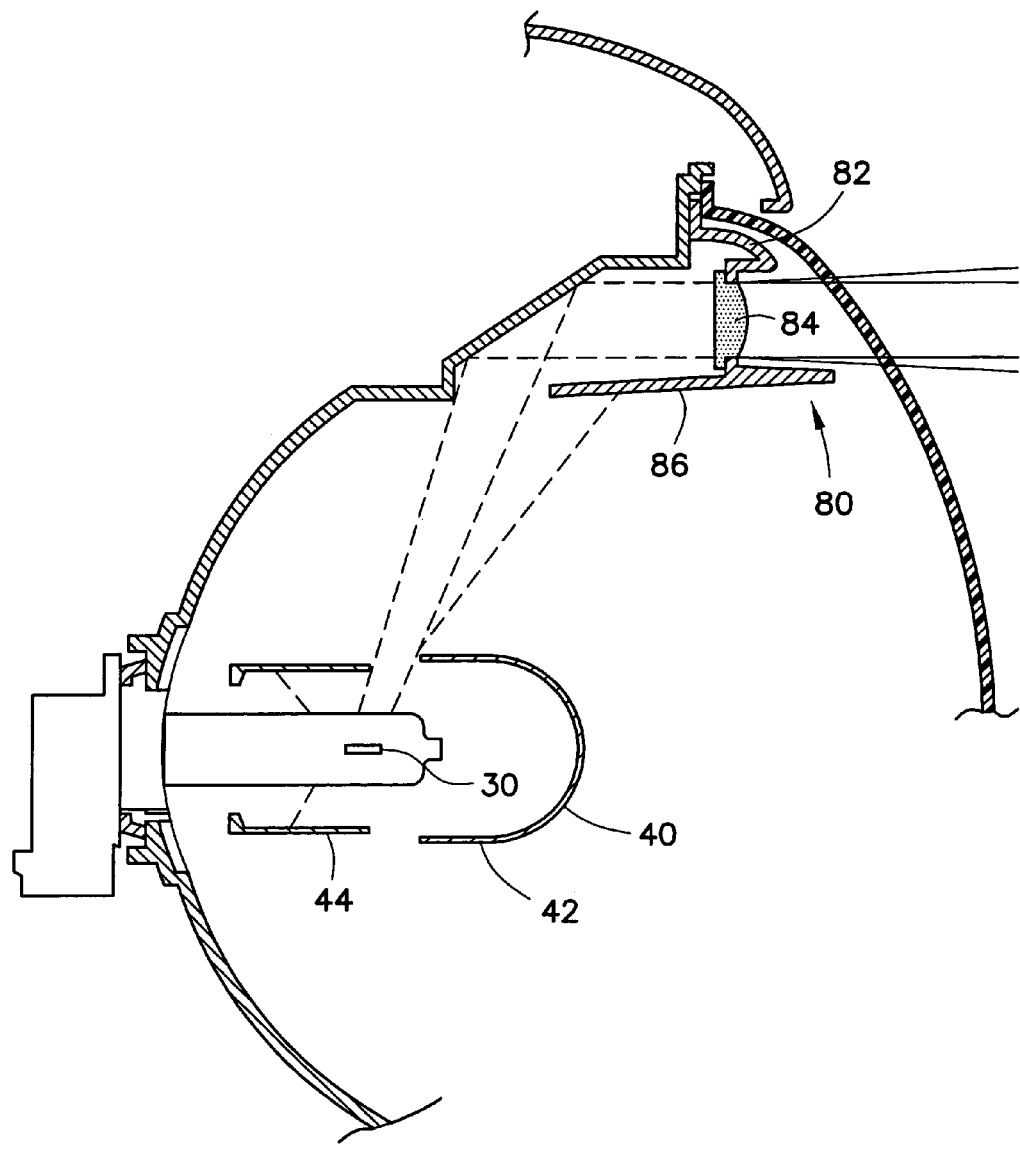
FIG. 10 is a side cross sectional view of the lamp assembly of FIG. 9, where the moveable shield is moved toward the rear portion of the lamp assembly.
Figure 11A:
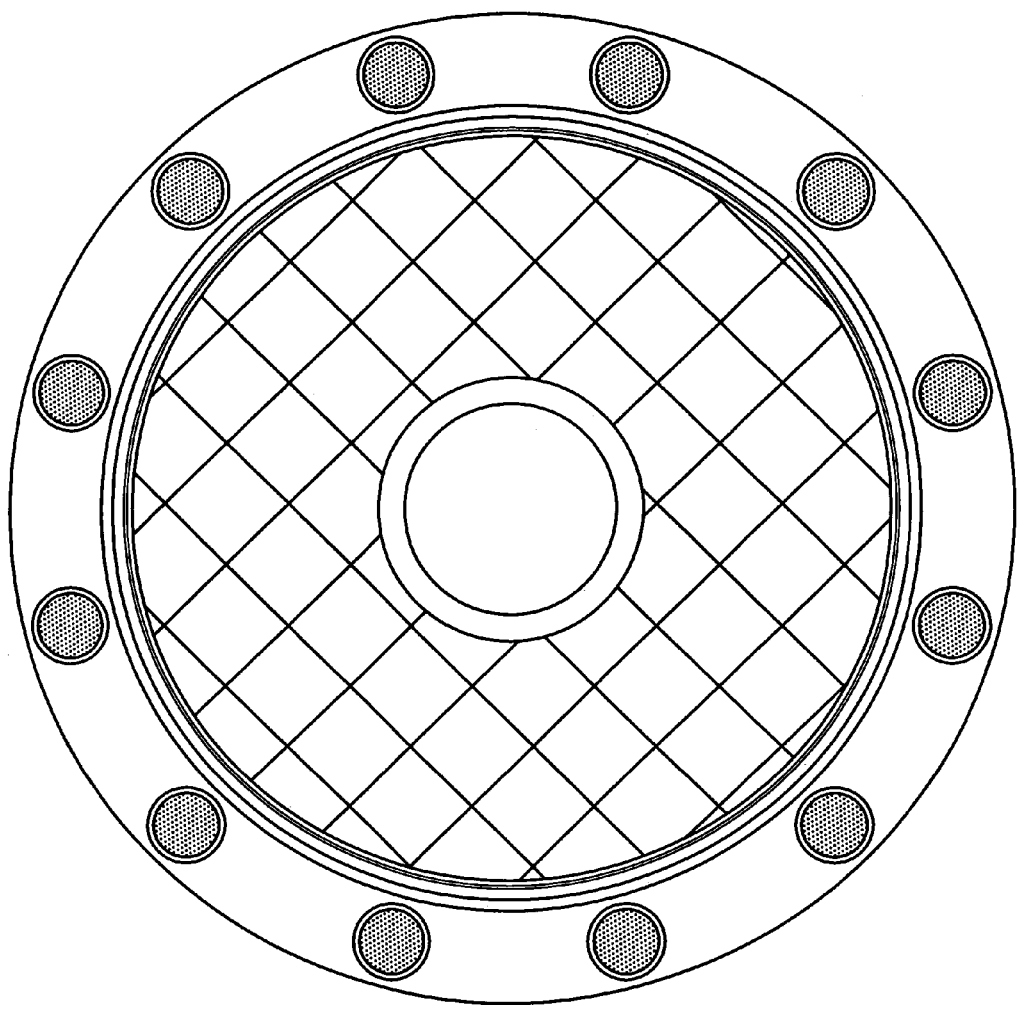
FIG. 11A is an exemplary front view of the lighted pattern of the lamp assembly of FIG. 10.

As shown in FIG. 8, when the moveable shield 44 is in the first position, the second alternate embodiment of the lamp assembly reflects light similarly to the above embodiment, described in FIGS. 1 and 3, and shown as the cross hatched area of FIG. 9. Referring now to FIG. 10, when the moveable shield 44 is in the second position, the moveable shield 44 absorbs the light which would strike the first reflective surface 22, and the opening between the moveable shield 44 and the fixed shield 42 allows light to strike the second reflective surface 26. Light reflected from the second reflective surface 26 passes through one of the plurality of peripheral lenses 84 before being emitted from the lamp assembly. As shown in FIG. 11A, an exemplary beam pattern is shown while the moveable shield 44 of the second alternate embodiment is in the second position. The plurality of peripheral lenses separate the peripheral beam of light into discrete sections, shown as shaded circles located peripherally about the main beam. The plurality of peripheral lenses thus form a plurality of points of light positioned around the beam patterns emitted from the lamp assembly.

Figure 11B:
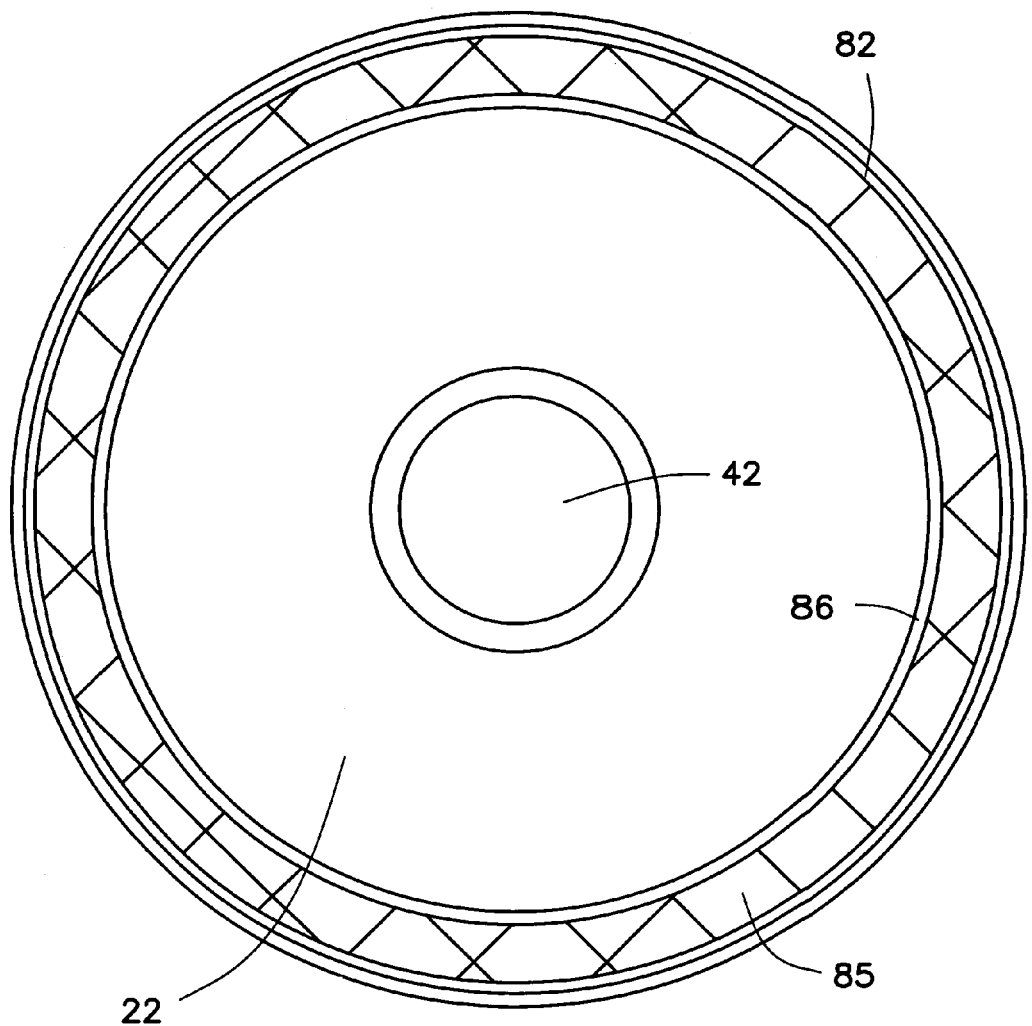
FIG. 11B is an exemplary front view of the lighted pattern of the lamp assembly of FIG. 10 where a ring shaped lens is substituted for the plurality of peripheral lenses.

One variation of the above-described second alternative embodiment is shown in FIG. 11B. In this variation, the plurality of peripheral lenses 84 are substituted for a single ring-shaped lens 85. Accordingly, the central ring portion 83 may be entirely comprised of the single ring shaped lens 85. With reference to FIGS. 8 and 10, if the plurality of peripheral lenses 84 are substituted for the single ring shaped lens 85, the single ring shaped lens is supported by retainer 80 and bounded by exterior support portion 82 and interior support portion 86. Light reflected from the second reflective surface and through the ring shaped lens portion forms a ring or "halo" shaped beam pattern, as shown by the cross-hatched area in FIG. 1B, which is a front view of the lamp assembly. Of course, from a side view, this ring shaped beam pattern forms a hollow cylindrical beam. Generally, this is a very similar beam pattern to that described above with reference to FIG. 4, but the use of additional optics on the ring shaped lens 85 produces a softer, more even glow than can be produced with reflector facets alone.

Figure 6:
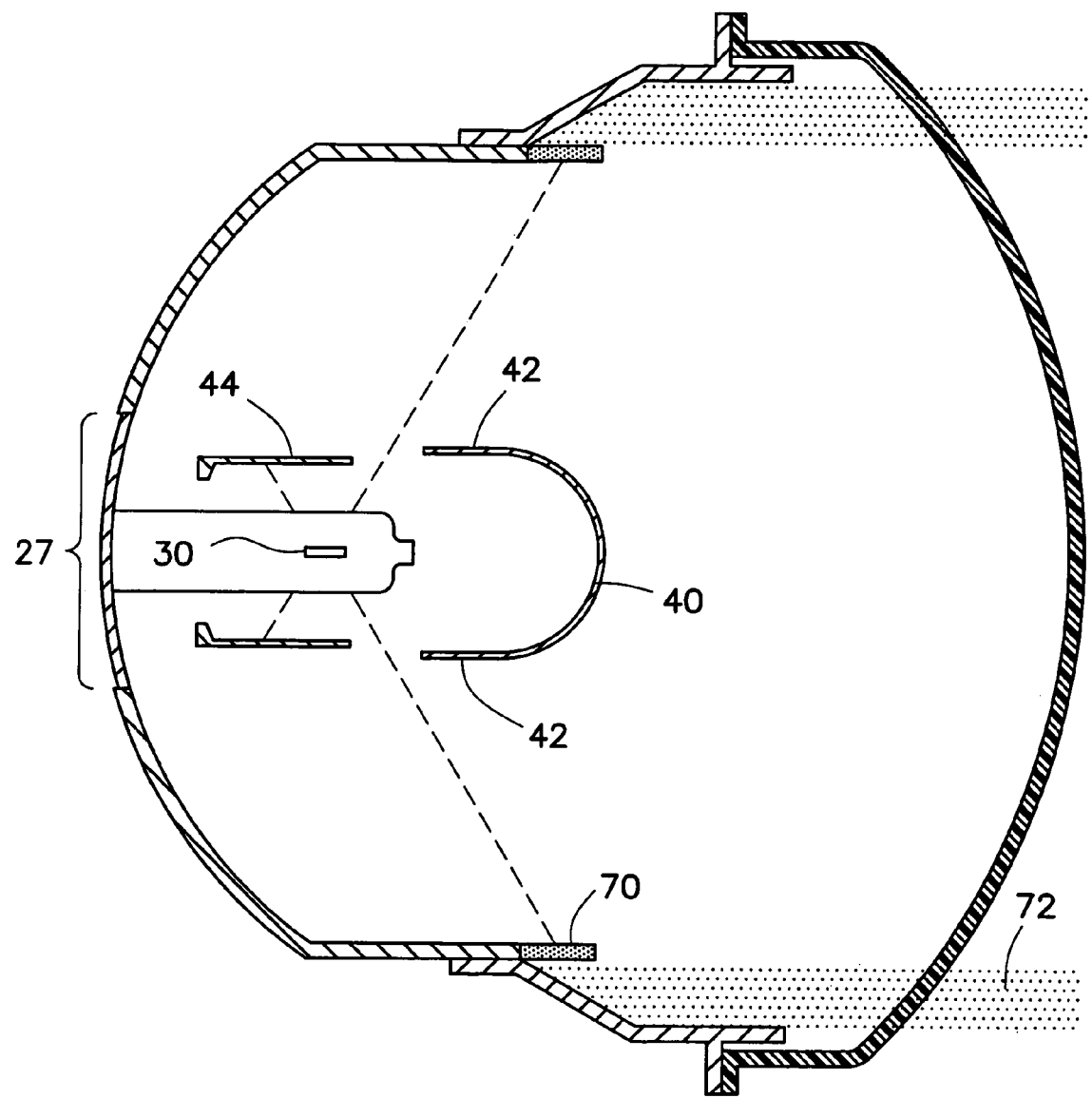
FIG. 6 is a side cross sectional view of the lamp assembly of FIG. 5, showing exemplary beams of light emitting from the lamp assembly.
Figure 7:
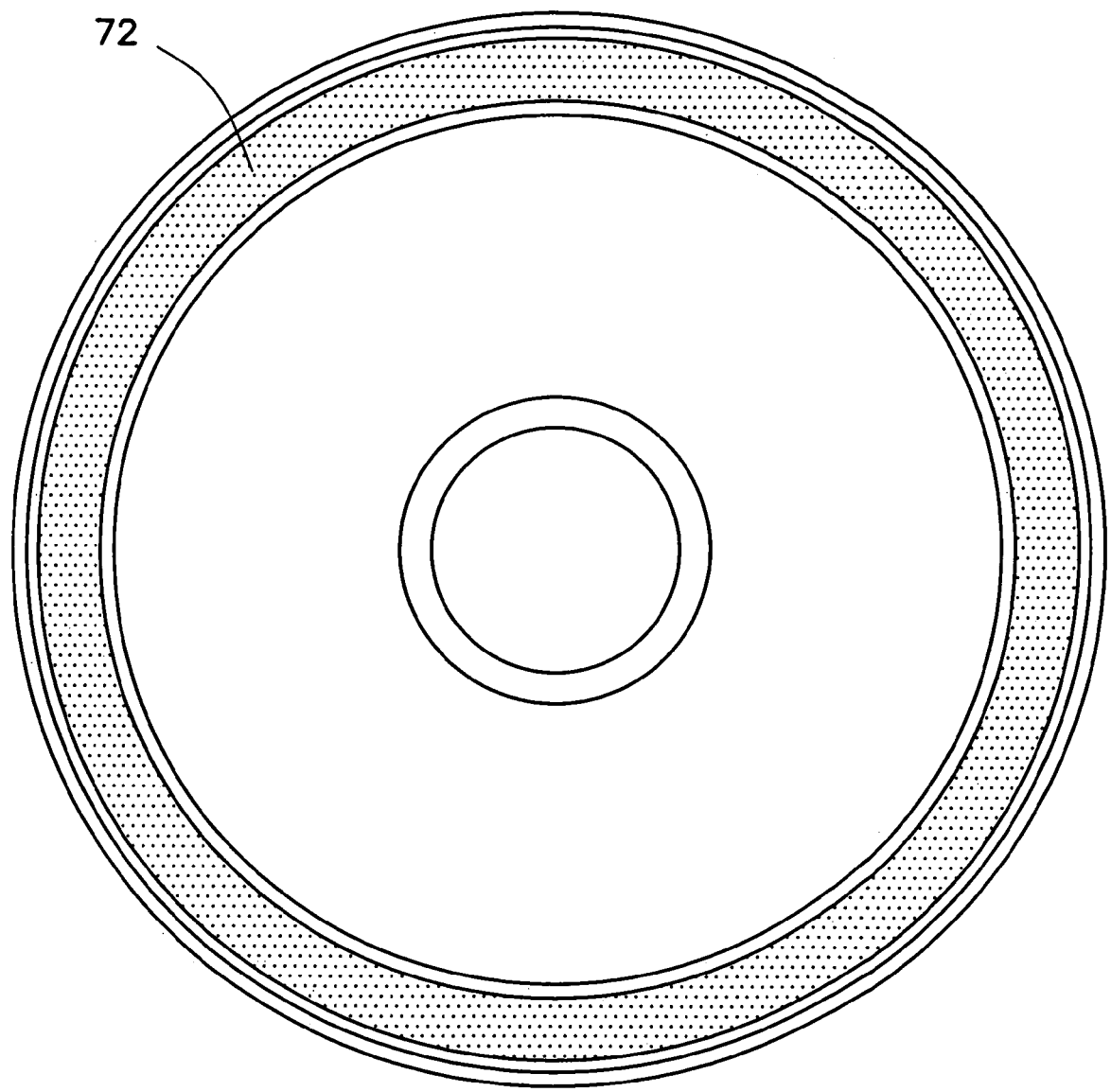
FIG. 7 is an exemplary front view of the lighted pattern of the lamp assembly of FIG. 6.
Figure 12:
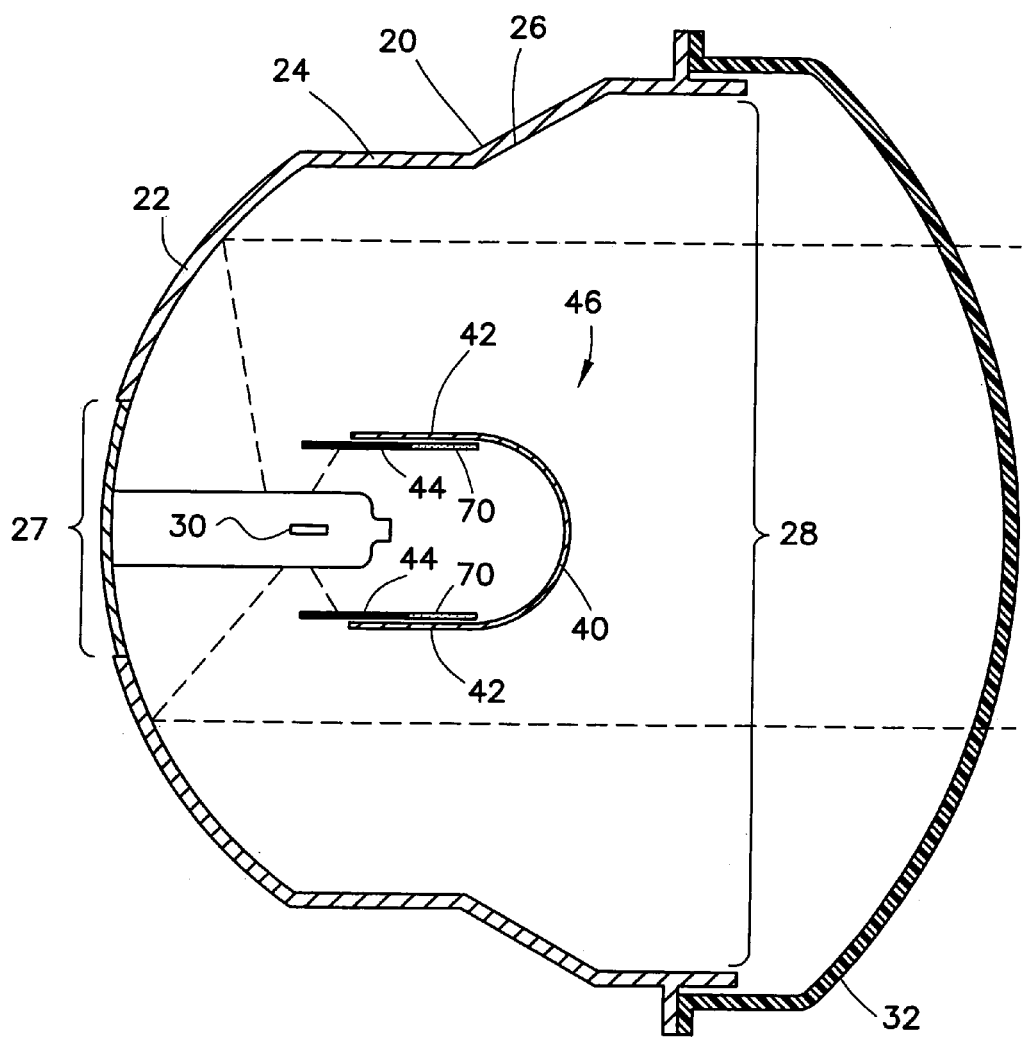
FIG. 12 is a side cross sectional view of a third alternate embodiment of a lamp assembly with a peripheral auxiliary function.
Figure 13:
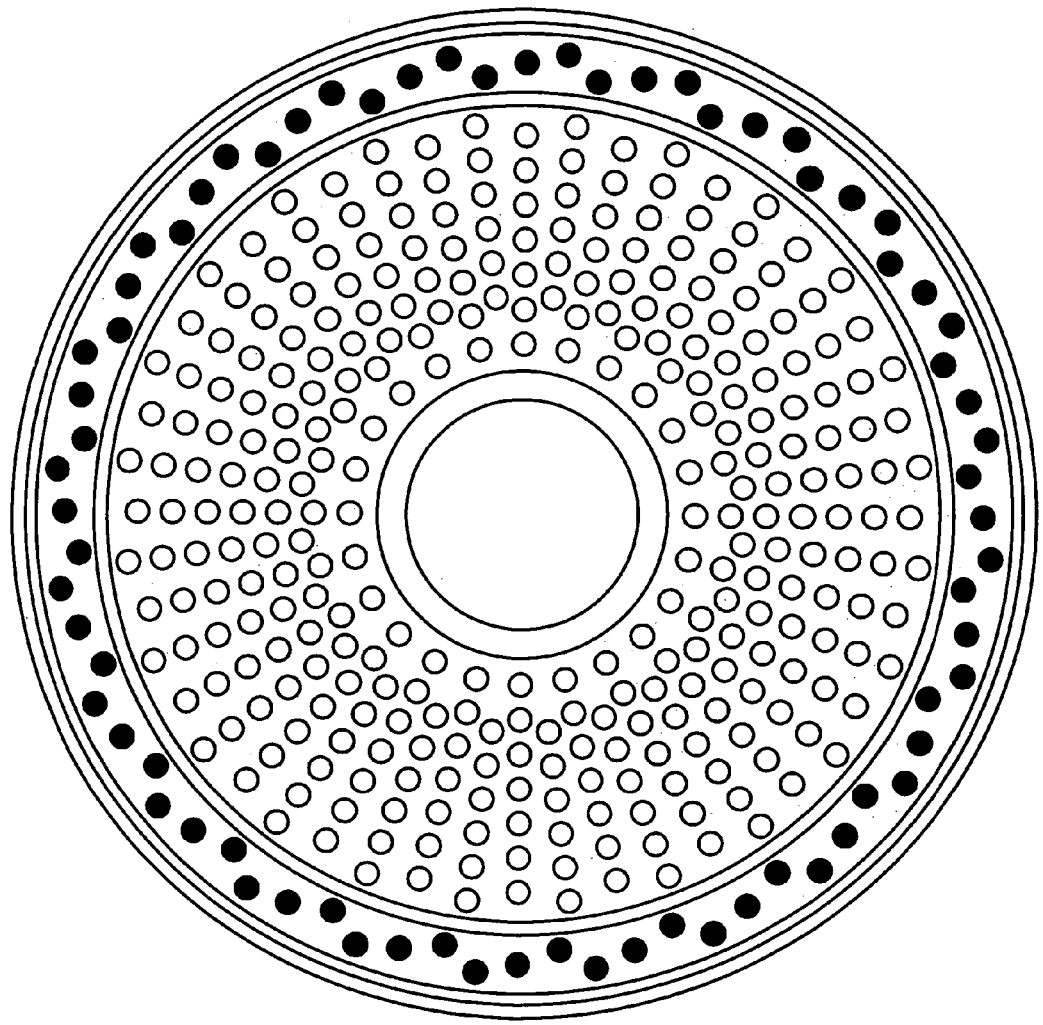
FIG. 13 is an exemplary front view of the lighted pattern of the lamp assembly of FIG. 12.

In a third alternate embodiment, as shown in FIG. 12, all of the elements of the first alternate embodiment disclosed in FIGS. 5 and 6 above are present, however the transparent color film 70 is attached as an extension of the moveable shield 44, instead of being attached to the housing 20. For example, the moveable shield 44 may be made of a colored glass or plastic material, with one portion 70 (i.e., the colored film portion) left translucent, and the remainder of the moveable shield 44 coated with an opaque material to block light from passing through that portion of the shield. In this third alternate embodiment, the opening created by the movement of the moveable shield 44 to the second position is covered by the transparent color film 70. Light emitted from the light source 30 in the direction of the second reflective surface 26 is therefore imparted with the color of the transparent color film 70, and is reflected by the second reflective surface 26 outside of the lamp assembly. Thus, a different color of light may be apparent between the main beam and the peripheral beam. As shown in FIG. 13, a main beam is denoted by open circles, and the peripheral beam is denoted by closed circles.

Figure 14:
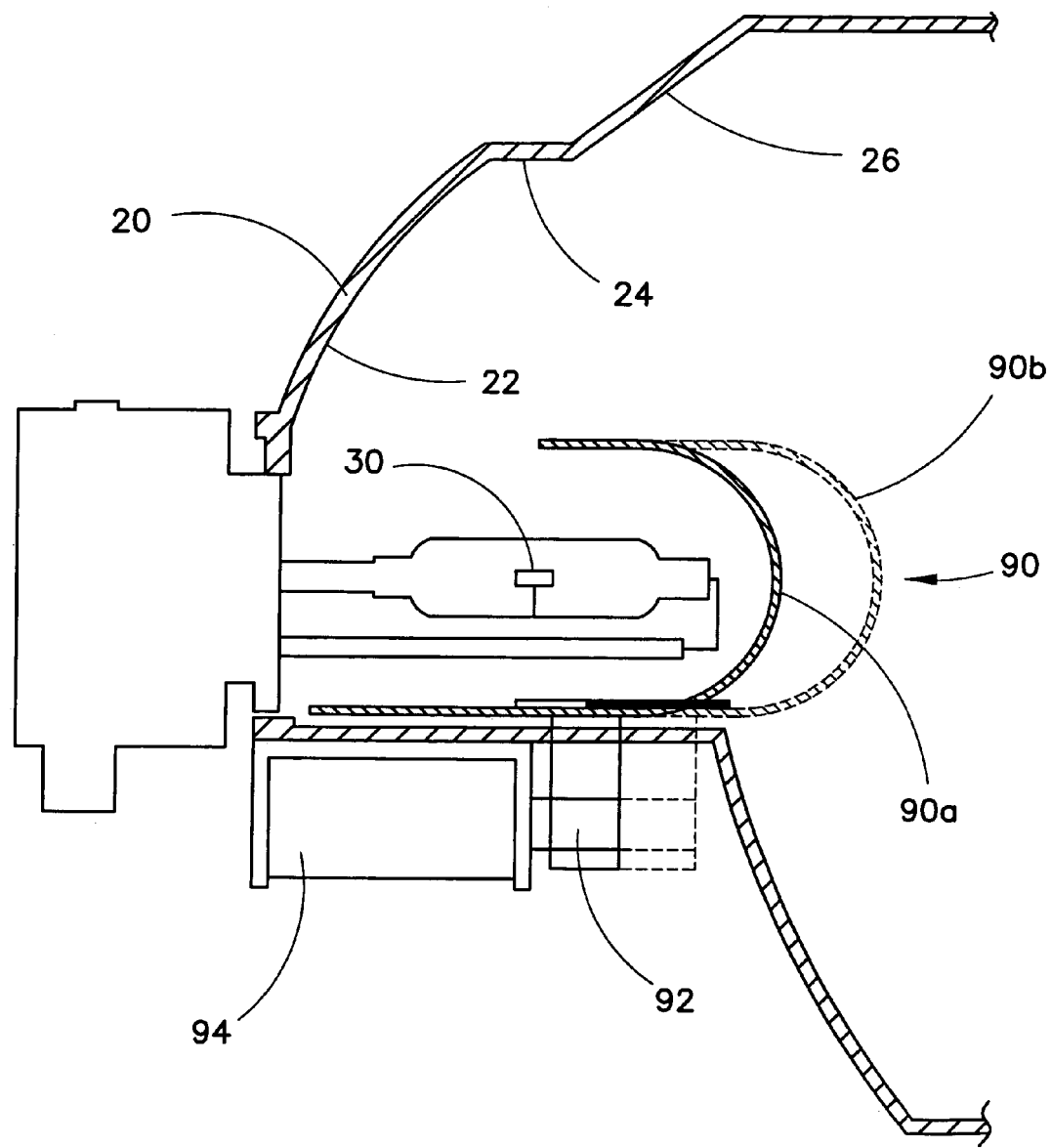
FIG. 14 is a side cross sectional view of a fourth alternate embodiment of a lamp assembly with a peripheral auxiliary function.

In a fourth alternate embodiment, as shown in FIG. 14, all of the elements of the embodiment disclosed in FIGS. 1 and 3 above are present, but the moveable shield 44 and the fixed shield 42 are replaced with a singular shield 90. The singular shield 90 is positioned within the housing 20, in front of the light source 30, and curves partially around the light source 30 such that it is partially forward of and partially surrounding the light source 30. The singular shield 90 is attached, in this fourth alternate embodiment, to a driver shaft 92. The driver shaft 92 is attached to a driver 94, which is operable to move the driver shaft 92 and the singular shield 90 axially, parallel to the optical axis, between a first position 90a and a second position 90b. Located in the first position 90a, the singular shield 90 partially shields the light source 30 from the housing 20. Light rays emitted from the light source 30 in the direction of the first reflective surface 22 are allowed to strike the first reflective surface 22, and are reflected and emitted from the lamp assembly. Light rays emitted from the light source 30 in the direction of the non-reflective surface 24 are absorbed by the non-reflective surface 24, and are not emitted from the lamp assembly. Light rays emitted from the light source 30 in the direction of the second reflective surface 26 are blocked and absorbed by the singular shield 90.

When located in the second position 90b, the singular shield 90 shields less of the light source 30 from the housing 20, as compared to the singular shield 90 in the first position. In particular, when located in the second position, light rays emitted from the light source 30 in the direction of the first reflective surface 22 are allowed to strike the first reflective surface 22 and are reflected and emitted from the lamp assembly. Light rays emitted from the light source 30 in the direction of the non-reflective surface 24 are absorbed by the non-reflective surface 24, and are not emitted from the lamp assembly. Light rays emitted from the light source 30 in the direction of the second reflective surface 26 allowed to strike the second reflective surface 26 and are reflected and emitted from the lamp assembly. Where several of the above embodiments moved a moveable shield 44 between a first position and a second position to selectively utilize either the first reflective surface 22 or the second reflective surface 26, respectively, the alternate embodiment shown in FIG. 14 moves a singular shield 90 between a first position 90a and a second position 90b to utilize either the first reflective surface 22 only or the combined first and second reflective surfaces 26. Thus, operating on the driver 94 to move the singular shield 90 to the first position 90a creates a main beam, as shown in FIG. 15 as the area of open circles, and operating on the driver 94 to move the singular shield 90 to the second position 90b creates the main beam and the peripheral beam, shown in FIG. 15 as the area of open circles and the area of closed circles, respectively.

Figure 15:
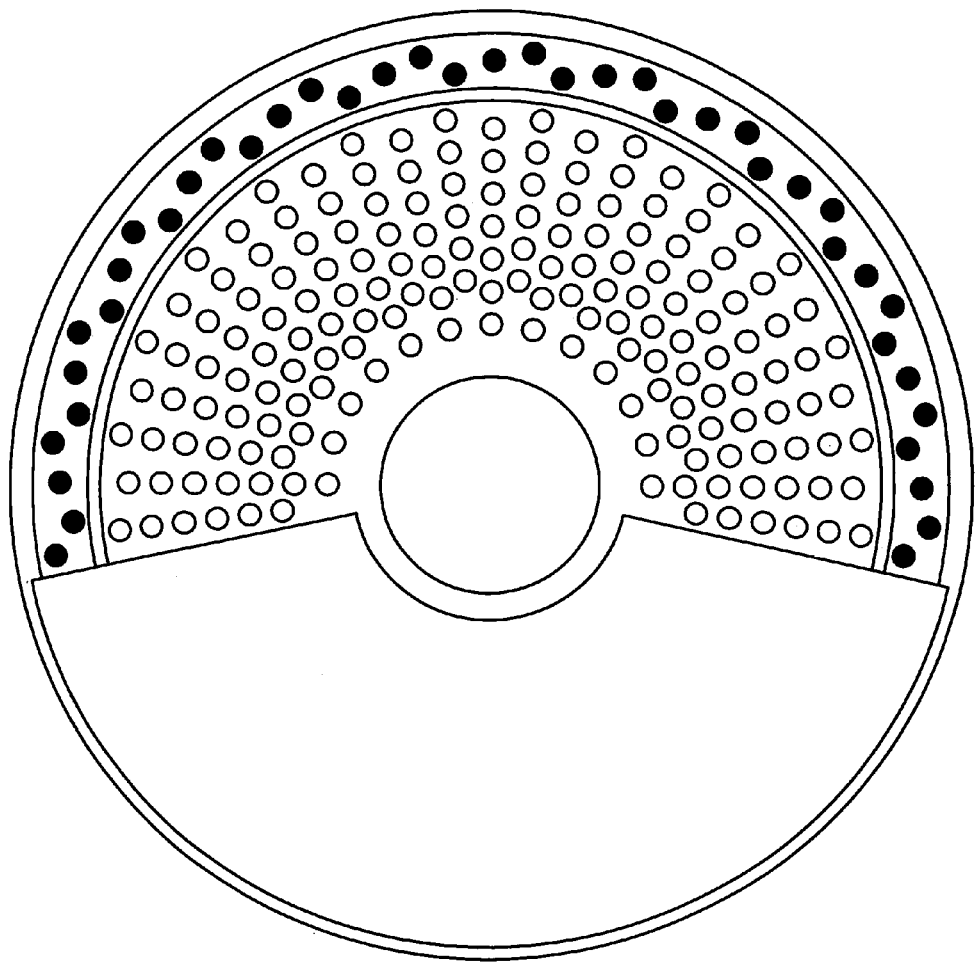
FIG. 15 is an exemplary front view of the lighted pattern of the lamp assembly of FIG. 14.
Figure 16:
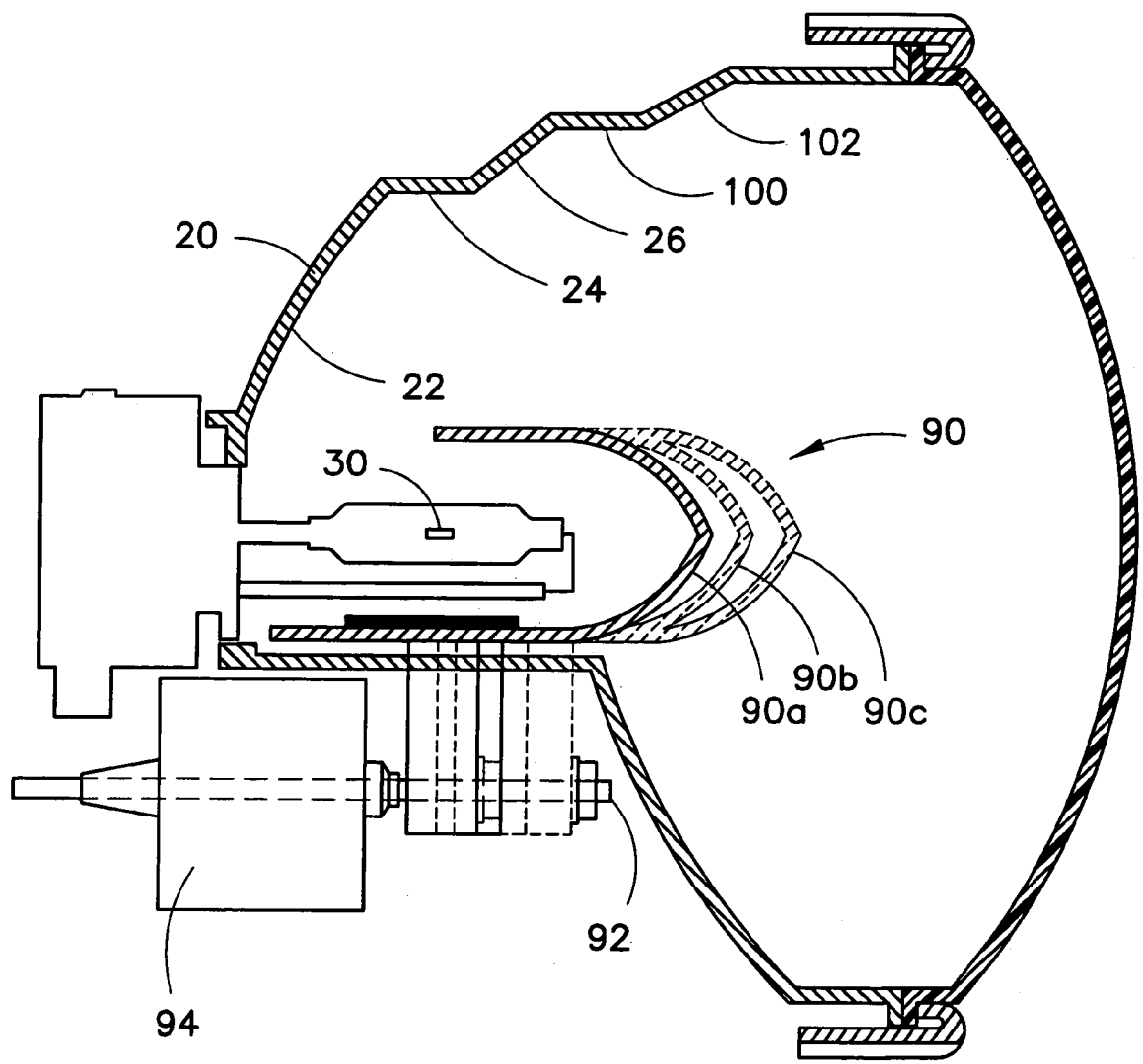
FIG. 16 is a side cross sectional view of a fifth alternate embodiment of a lamp assembly with a peripheral auxiliary function.

In a fifth alternate embodiment, as shown in FIG. 16, all of the elements of the embodiment disclosed in FIGS. 14 and 15 above are present, but the housing 20 further comprises a second non-reflective surface 100, and a third reflective surface 102, and the driver 94 is operable to move the singular shield 90 between a first position 90a, a second position 90b, and a third position 90c. In the first position 90a, the singular shield 90 blocks light emitted from the light source 30 from striking the second reflective surface 26 and the third reflective surface 102, yielding the beam pattern shown in FIG. 17 as the area of open circles 110. In the second position 90b, the singular shield 90 blocks light emitted from the light source 30 from striking the third reflective surface 102, yielding the beam pattern shown in FIG. 17 as the area of open circles 110 joined with the area of closed circles 112. Located in the third position 90c, the singular shield 90 allows light emitted from the light source 30 to strike the first reflective surface 22, the second reflective surface 26, and the third reflective surface 102, yielding the beam pattern shown in FIG. 17 as the area of open circles 110 joined with the area of closed circles 112 and also joined with the area of hashed circles 114.

Figure 17:
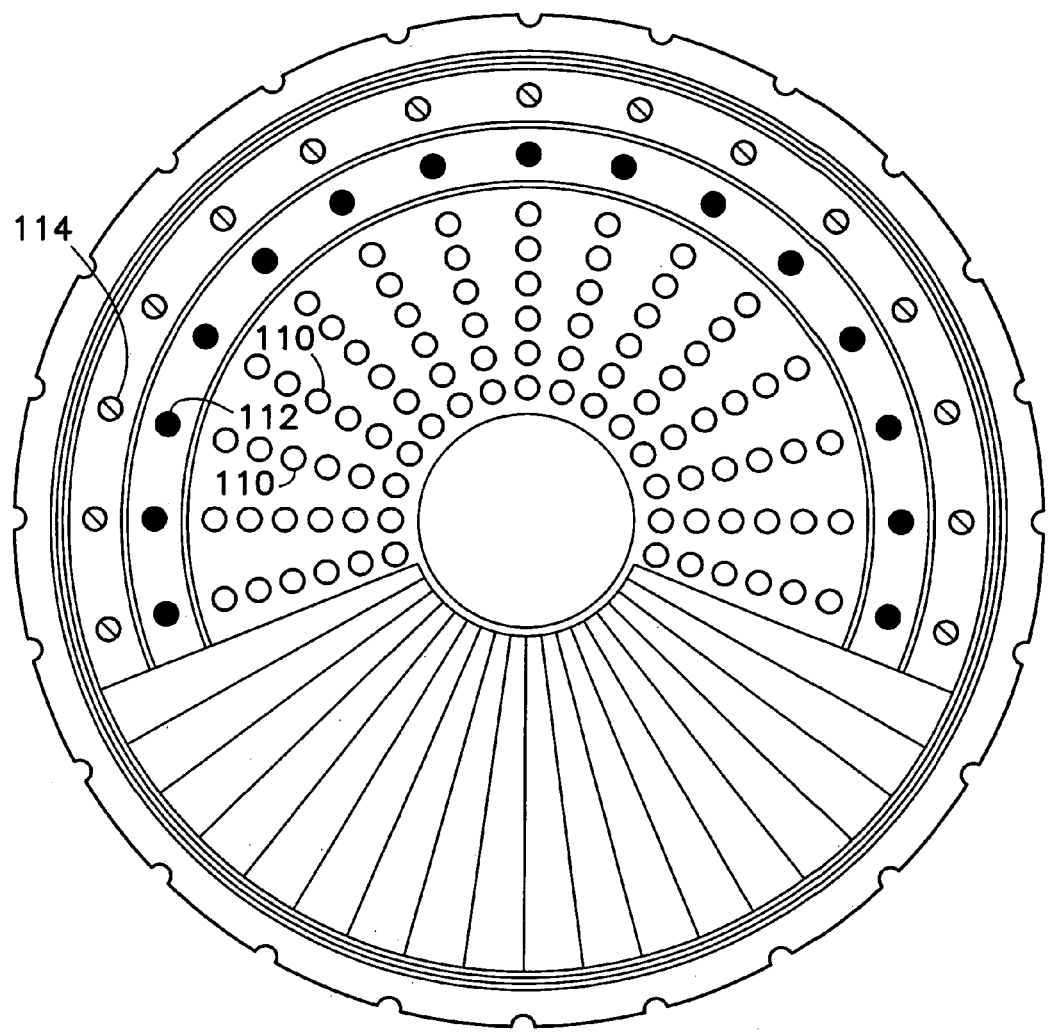
FIG. 17 is an exemplary front view of the lighted pattern of the lamp assembly of FIG. 16.
Figure 18:
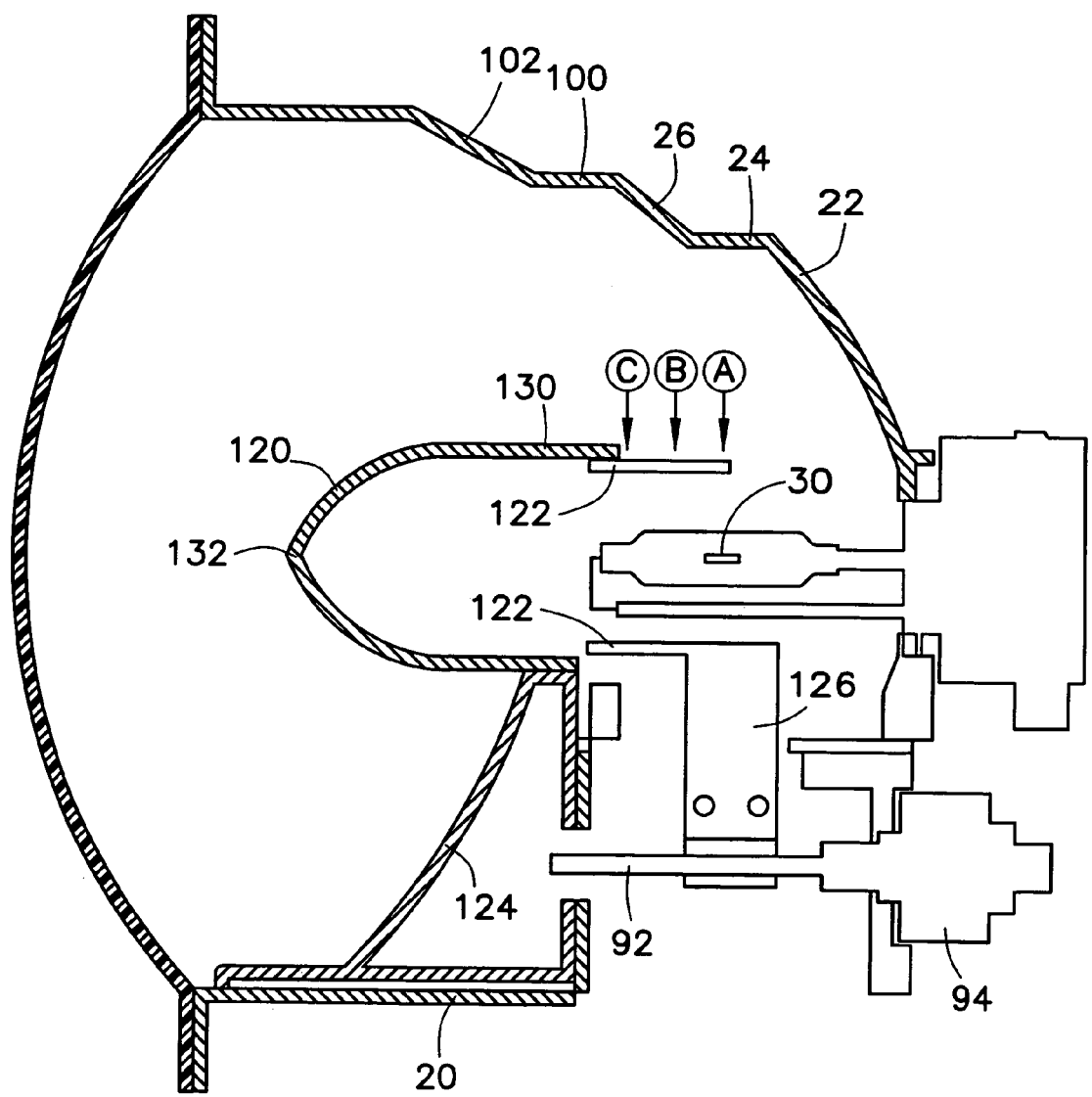
FIG. 18 is a side cross sectional view of a sixth embodiment of a lamp assembly with a peripheral auxiliary function.

In a sixth alternate embodiment, as shown in FIG. 18, all of the elements of the embodiment disclosed in FIGS. 16 and 17 above are present, but instead of a single light shield 90, a fixed light shield 120 and a moveable light shield 122 are disclosed. The fixed shield is cylindrical in shape with an open end 130 and a closed end 132. The closed end 132 of the fixed shield is typically decorative and contributes to the ornamental design of the lamp assembly. The moveable shield 122 is also cylindrical in shape, is coaxial with the open end 130 of the fixed shield, and is slightly smaller in diameter than the fixed shield 120, so that the moveable shield 122 may be inserted into the open end 130 of the fixed shield 120. The fixed shield is mounted upon a stationary support strut 124 that is attached to the housing 20. The moveable shield is mounted upon a moveable shield support strut 126 that is attached to the shaft of a solenoid or other actuator. Instead of moving a singular shield 90 forward to expose additional portions of the reflector the light source, as shown in FIG. 16, the actuator 94 of FIG. 18 moves the moveable shield forward into the fixed shield in FIG. 18 to expose additional portions of the reflector to the light source 30. Because the reflector shown in FIG. 18 includes three distinct reflective surfaces, 22, 26 and 102, the actuator is operable to move the rear edge of the moveable shield between one of three positions, as indicated by the letters "A", "B", and "C" and the accompanying arrows in FIG. 18. Movement of the moveable shield to position "A" results in exposure of the first reflective portion 22 to the light source. Movement of the moveable shield to position "B" results in exposure of the first 22 and second 26 reflective portions to the light source. Movement of the moveable shield to position "C" results in exposure of the first 22, second 26, and third 102 reflective portions to the light source. Accordingly, the alternate embodiment shown in FIG. 18 is very similar to that of FIGS. 16 and 17, but the lighting effects are achieved with two light shields instead of a single light shield.

As can be readily seen, the described utilization of one or more bulb shields to create alternate beam patterns allows one lamp assembly to operate more than one illumination function. The use of a single lamp assembly reduces the size and weight associated with multiple lamp assemblies, and also reduces the electricity required to provide the many required and desired illumination functions on an automobile, by reducing the overall number of bulbs required for such functionality. Furthermore, the above-described embodiments provide unique styling features for automotive lamp assemblies.

Although the above lamp assembly has been described in considerable detail with reference to certain preferred versions thereof, other versions are possible. Accordingly, while other advantages may be found and realized and various modifications may be suggested by those versed in the art, it is understood that the present invention is not to be limited to the details given above, but rather may be modified within the scope of the appended claims.

I claim:

1. An automotive lamp assembly comprising:
   a. a reflector comprising a first reflective surface, a second reflective surface, and a non-reflective surface disposed between the first reflective surface and the second reflective surface;
   b. a light source positioned to shine light on the reflector;
   c. a light shield partially surrounding the light source;
   d. a driver attached to the light shield and operable to move the light shield axially between a first position and a second position, such that when the light shield is in the first position light shines on the first reflective surface and the non-reflective surface and is substantially blocked from striking the second reflective surface, and when the light shield is in the second position light shines on the second reflective surface and the non-reflective surface and is substantially blocked from striking the first surface.

2. The lamp assembly of claim 1, wherein the non-reflective surface is a matte surface.

3. The lamp assembly of claim 1 wherein the non-reflective surface is substantially parallel to the optical axis of the lamp assembly.

4. The lamp assembly of claim 1, wherein the light shield is substantially cylindrical.

5. The lamp assembly of claim 1, wherein the driver is comprised of a solenoid.

6. The lamp assembly of claim 1 further comprising a third reflective surface and a second non-reflective surface positioned between the second and third reflective surfaces.

7. The lamp assembly of claim 6 wherein the driver is further operable to move the light shield between a first position, a second position, and a third position.

8. The lamp assembly of claim 1 wherein light reflected from the first reflective surface forms a low beam or high beam and light reflected from the second reflective surface forms a plurality of points of light positioned around the low beam or the high beam.

9. An automotive lamp assembly comprising:
   a. a reflector comprising a first reflective surface, a second reflective surface, and a non-reflective surface disposed between the first reflective surface and the second reflective surface;
   b. a light source positioned to shine light on the reflector;
   c. a light shield positioned partially forward of and partially surrounding the light source;
   d. a driver, attached to the light shield and operable to move the light shield between a first position and a second position, such that when the light shield is in the first position light shines on the first reflective surface, and when the light shield is in the second position light shines on the first reflective surface and the second reflective surface.

10. The lamp assembly of claim 9, wherein the non-reflective surface is a matte surface.

11. The lamp assembly of claim 9 wherein the non-reflective surface is substantially parallel to the optical axis of the lamp assembly.

12. The lamp assembly of claim 9, wherein the light shield is substantially cylindrical and coaxial with the optical axis of the lamp assembly.

13. The lamp assembly of claim 9, wherein the driver is comprised of a solenoid.

14. The lamp assembly of claim 9 further comprising a third reflective surface and a second non-reflective surface positioned between the second and third reflective surfaces.

15. The lamp assembly of claim 14 wherein the driver is further operable to move the light shield between a first position, a second position, and a third position.

16. The lamp assembly of claim 9 wherein light reflected from the first reflective surface forms a low beam or high beam and light reflected from the second reflective surface forms a plurality of points of light positioned around the low beam or high beam.

17. A method of providing a plurality of distinct beam patterns in an automotive headlamp comprising the steps of:
   a. providing a lamp assembly comprising a housing having a first reflective surface, a second reflective surface, and a non-reflective surface disposed between the first reflective surface and the second reflective surface, a light source positioned within the housing, and a light shield positioned partially forward of and partially surrounding the light source;
   b. placing the light shield in a first position that substantially blocks light from striking the second reflective surface, but allows light to strike the first reflective surface, thereby providing a primary beam;
   c. moving the light shield axially from the first position to a second position that allows light to strike both the first reflective surface and the second reflective surface, therby providing a secondary beam.

18. An automotive lamp assembly having an optical axis, the lamp assembly comprising:
   a. a light source;
   b. a first reflective surface arranged and disposed to reflect light from the light source to form a solid beam pattern;
   c. a second reflective surface arranged and disposed to reflect light from the light source and provide a beam pattern that forms a plurality of points of light positioned about the optical axis;
   d. a non-reflective surface positioned in between the first reflective surface and the second reflective surface; and
   e. at least one driver attached to and operable to move a shield between a first position and a second position, such that when the shield is in the first position light shines on the first reflective surface and the non-reflective surface and is substantially blocked from striking the second reflective surface and when the light shield is in the second position light shines on the second reflective surface and the non-reflective surface and is substantially blocked from striking the first reflective surface.

19. The lamp assembly of claim 18 wherein the second reflective surface is a single integral reflective surface and a plurality of lenses are positioned in front of the single integral reflective surface to form the plurality of points of light.

20. The lamp assembly of claim 19 wherein the plurality of lenses are positioned upon a ring shaped retainer.

21. An automotive lamp assembly having an optical axis, the lamp assembly comprising
   a. a light source;
   b. a first reflective surface arranged and disposed to reflect light from the light source for a low beam or high beam;
   c. a second reflective surface arranged and disposed to reflect light from the light source;
   d. a non-reflective surface positioned in between the first reflective surface and the second reflective surface; and
   e. a shield movable between a first position that allows light from the light source to strike the first reflective surface to form a first light beam, and a second position that allows light from the light source to strike the first and the second reflective surfaces to form a second light beam.

22. The lamp assembly of claim 21, wherein the light shining on the second reflective surface provides a beam pattern that forms a 360 degree circumference, ring shaped beam of light positioned around the optical axis.

* * * * *